March 26, 1935.　　　W. L. McEVER　　　1,995,893
INCINERATION
Filed Dec. 3, 1931　　　2 Sheets-Sheet 1

INVENTOR
William Lenton McEver
BY
his ATTORNEY

March 26, 1935.  W. L. McEVER  1,995,893
INCINERATION
Filed Dec. 3, 1931   2 Sheets-Sheet 2
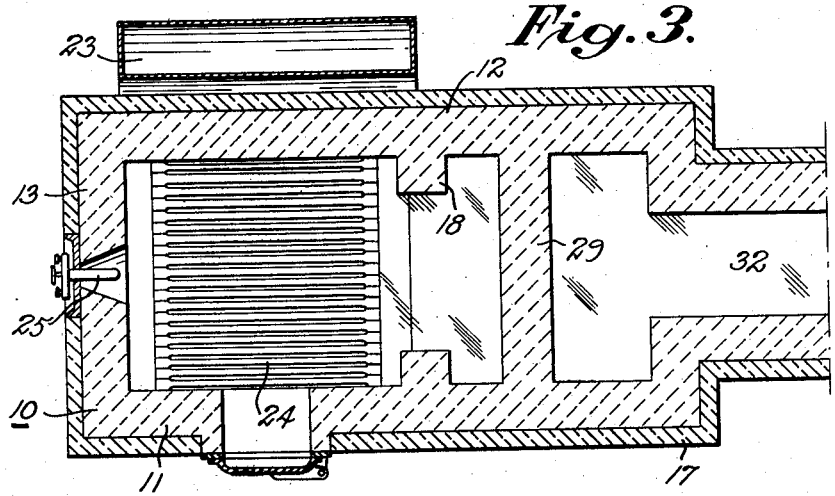
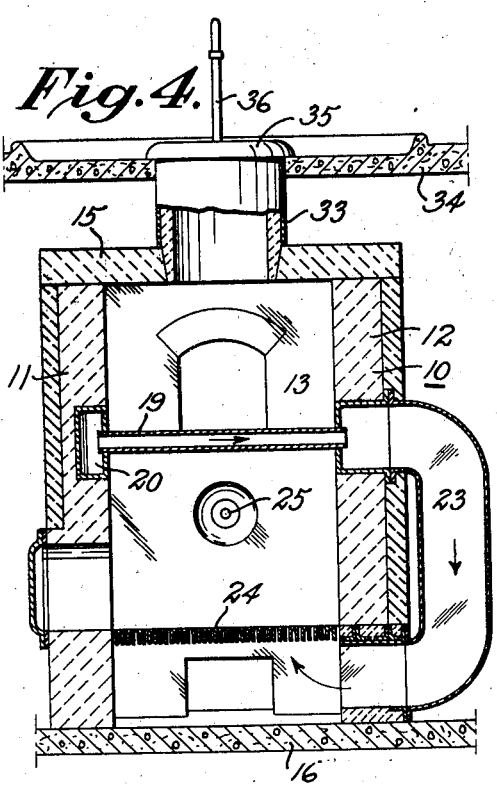
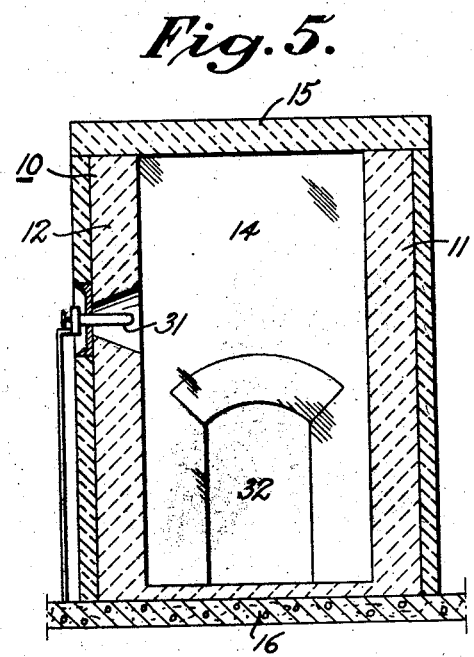

Patented Mar. 26, 1935

1,995,893

UNITED STATES PATENT OFFICE 1,995,893

INCINERATION

William Linton McEver, Winston-Salem, N. C., assignor, by mesne assignments, to Decarie Incinerator Corporation, New York, N. Y., a corporation of New York Application December 3, 1931, Serial No. 578,651

7 Claims. (Cl. 110—17)

My invention relates to incineration and particularly to an apparatus and method for incinerating screenings removed from a sewage disposal plant.

Screenings consist of the solid matter removed from a sewage stream by passing it through a screen. The solid matter is partially dried before being supplied to an incinerator. However, such material is not completely dried and hence, although comprising a large amount of combustible material, cannot be burned alone.

In accordance with my invention the screenings are dumped onto and supported by hollow grate members through which is passed a current of air. This air serves to maintain these grate members at a comparatively low temperature, while at the same time the air is heated. This heated air is then introduced below the hollow grate members where it is preferably mixed with the products of combustion from a separate source such as a garbage incinerator or a part of it is used to support combustion of suitable fuel directly beneath the hollow grate members. A portion of the gaseous fluid is passed through the screenings on the hollow grate members, thereby causing the screenings to be dried and to burn. The remaining portion of the gaseous fluid is bypassed around the hollow grate and mixed with the products of combustion coming from the screenings. This mixture contains excess air which may combine with any of the gases coming from the screenings which have not been completely burned. The gases finally leaving the incinerator are therefore completely burned and substantially odorless.

Further objects and advantages will be apparent from the following description considered in connection with the accompanying drawings, which form a part of this specification and on which:

Fig. 3 is a cross-sectional view taken on the line 3—3 of Fig. 2;

Fig. 4 is a cross-sectional view taken on the line 4—4 of Fig. 1;

Fig. 5 is a cross-sectional view taken on the line 5—5 of Fig. 1.

Figure 1:
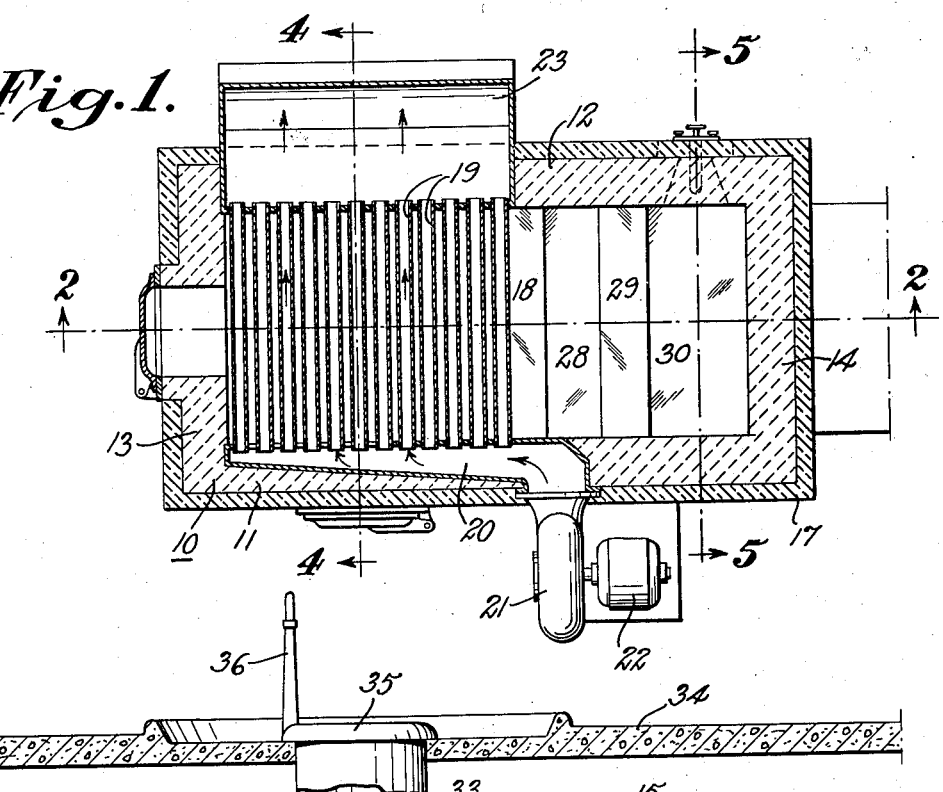
Fig. 1 is a horizontal cross-sectional view, taken on the line 1—1 of Fig. 2, of a preferred embodiment of my invention wherein fuel is burned below the hollow grate members.
Figure 2:
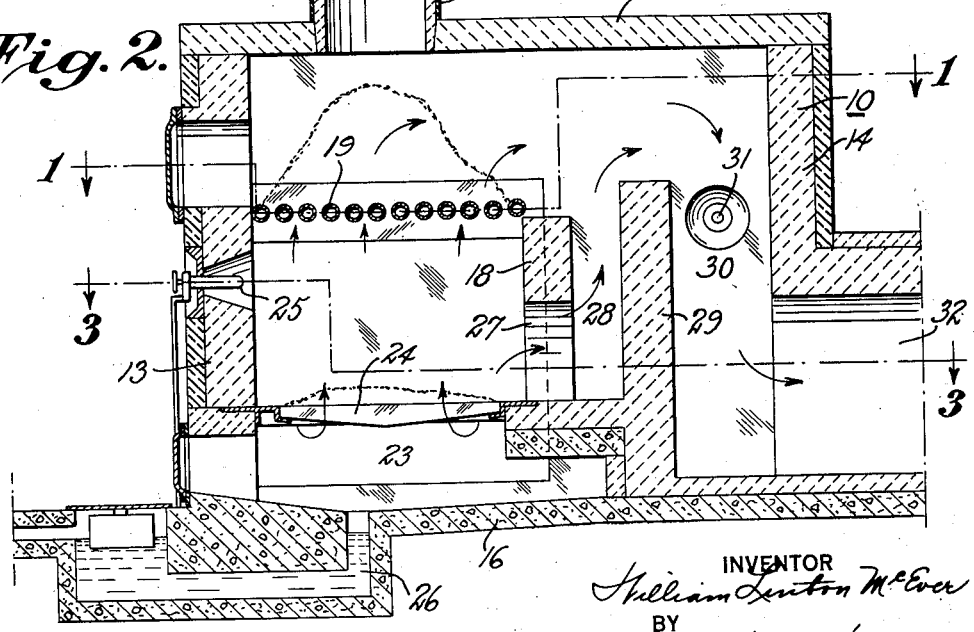
Fig. 2 is a cross-sectional view taken on the line 2—2 of Fig. 1.

Referring first to the embodiment shown in Figs. 1 through 5, reference character 10 designates an incinerator comprising a setting formed by side walls 11 and 12, end walls 13 and 14, a roof 15 and a floor 16. The walls are preferably of fire brick and may be covered with insulating material 17. Extending transversely across the incinerator and spaced from the rear wall 14 is a bridge wall 18 extending a little more than one-half the height of the incinerator. Extending across the incinerator at substantially the same level as the top of bridge wall 18 and forward thereof is a series or bank of hollow horizontally disposed grate members 19. Members 19 are spaced somewhat so as to allow the passage of air therebetween but are close enough together to permit the unburned screenings to pile up thereon. One end of each of members 19 is connected to a cold air header or box 20 which is supplied with cold air by a fan 21 operated by an electric motor 22. The other end of each of members 19 communicates with a hot air header or box 23 of relatively large cross section and extends outwardly, downwardly and inwardly and communicates with the bottom of the incinerator just above the floor 16. Members 19 are preferably cylindrical tubes. Just above the lower end of header 23 there is located a grate 24 which may be a stationary, dumping, shaking or any other suitable type of grate. Extending through wall 13 just below grate members 19 is an oil or gas burner 25. The air inlet header to the upper grate composed of the members 19 is tapered from the supply end toward the closed end to compensate for the passage of air into the tubes 19 along the header. A drain 26 is provided from the bottom of the incinerator chamber for the purpose of draining off any liquid which may drop from the screenings on grate 19. Drain 26 is arranged so as to form a liquid trap whereby gases from the incinerator cannot escape therethrough.

The lower part of bridge wall 18 is formed with an opening 27 therethrough leading to a passageway 28 located between bridge wall 18 and a second unapertured bridge wall 29. The top of bridge wall 29 is at about the same level as but slightly higher than the top of bridge wall 18. A passageway 30 is formed between bridge wall 29 and wall 14 of the incinerator. An oil or gas burner 31 is located so as to project a stream of fuel into passageway 30. A flue 32 leads from the bottom of passage 30 to a suitable stack or other vacuum producing means.

Extending through roof 15 at a point above grate members 19 is a chute 33 which extends through an upper floor 34 above the incinerator, Chute 33 is normally closed by a cover 35 which may be opened by a handle 36.

The operation of the above described device is as follows:

Screenings taken from a sewage disposal plant are conveyed to chute 33 and dumped through the chute onto grate members 19. These screenings consist of chiefly combustible materials but are wet or damp and hence will not burn of their own accord. Cold air or other combustion supporting gaseous fluid is forced by fan 21 through header 20 and hollow grate members 19 into header 23. This cold air maintains the grate 19, upon which the screenings are burning, at a comparatively low temperature and hence prevents burning out of the grate. The air heated in its passage through members 19 is conveyed by the duct or header 23 to the space below the lower grate 24 in the bottom of the incinerator. Due to the large cross section of the duct or header 23 as compared with the sum of the cross sections of the tubes 19, it accommodates the flow of air at a much lower velocity than would otherwise be the case. This air thence passes upwardly through grate 24 and a portion of the air is utilized for supporting combustion of the fuel introduced through burner 25 or for burning coal or coke on grate 24. There is thus formed in the space beneath grate 19 a mixture of the products of combustion of the fuel introduced through the burner and excess air. This mixture is at a very high temperature, due to the combustion of the fuel. A portion of this mixture is passed through the screenings supported on the grate 19 and raises their temperature to such a point that combustion of the screenings will be supported by the excess air present in the mixture. The remaining portion of the mixture passes through the upwardly extending by-pass around grate 19 comprising opening 27 in bridge wall 18 and passageway 28 and is mixed with the products of combustion coming from the screenings on grate 19. These products of combustion may contain gases which are not completely burned and which are apt to have a disagreeable odor which may be removed by complete combustion of the gases. These gases, including excess air present in the mixture by-passed around the upper grate, pass into the passageway or down-pass 30 where they are heated to a high temperature by means of the burner 31, whereby all of the gases are completely burned and in this state are discharged through flue 32 to a stack.

As the screenings on the elevated grate 19 are burned the resulting ash falls through the grate and is supported on lower grate 34. Here any material which was not burned on grate 19 is incinerated and the ash finally resulting is removed by shaking or dumping grate 24. Any liquid from the screenings passes into drain 26 and is conveyed to waste.

If desired, solid fuel may be supplied to and burned on grate 24 instead of using burner 25. In this event, material falling through grate 19 will fall into the fire on grate 24 and will be burned. Also, a grate similar to grate 24 may be placed in passageway 30 or flue 32 on which solid fuel may be burned in order to maintain a zone of high temperature through which the gases passing out through the flue must pass instead of using fluid burner 31 for this purpose.

It will thus be seen that air is used to maintain the hollow grate members 19 at a comparatively low temperature and the air thus preheated is mixed with hot products of combustion, either from an independent source or from an oil or gas burner, and the mixture passed through the screenings in order to incinerate them.

While I have shown and described one specific modification of my invention, it is to be understood that this is for purposes of illustration only and that my invention is not to be limited thereby, but its scope is to be determined by the appended claims viewed in the light of the prior art.

What I claim is:

1. An incinerator comprising walls forming a setting, air headers at opposite sides of said chamber, a plurality of relatively closely spaced tubes connected to said headers and disposed horizontally to form a grate in said chamber, a second grate in said chamber below said first mentioned grate, means to supply air to one of said headers, means to conduct air from the opposite header to the space below said second grate, an outlet at one end of said chamber and a fluid fuel burner situated at the opposite end of said chamber to direct fuel into the space between the grates.

2. An incinerator comprising walls forming a setting, air headers in opposite walls of said setting, a plurality of relatively closely spaced tubes connected to said headers and disposed horizontally to form a grate, a second grate below said first mentioned grate, means to supply air to one of said headers, means to conduct air from the opposite header to the space below said second grate, an off-take passage connected with the space above the first mentioned grate, and a plurality of bridge walls providing a by-pass around the first mentioned grate, the first bridge wall encountered by the combustion gases in their flow to the off-take passage being apertured.

3. An incinerator comprising walls forming a setting, air headers in opposite walls of said setting, a plurality of relatively closely spaced tubes connected to said headers and disposed to form a grate, a bridge wall at the rear of said grate having an aperture therein, a second bridge wall behind the first mentioned bridge wall, an exit flue, said second bridge wall extending above said flue, a second grate below the first mentioned grate, and means to conduct air from one of said headers to below said second grate, said bridge walls providing upward flow of gas through the first-mentioned grate and upward flow of gas laterally of said first mentioned grate and downward flow of all of the gases to the flue.

4. An incinerator comprising walls forming a setting, air headers in opposite walls of said setting, a plurality of relatively closely spaced tubes connected to said headers and disposed to form a grate, a bridge wall at the rear of said grate having an aperture therein, a second bridge wall behind the first mentioned bridge wall, an exit flue, said second bridge wall extending above said flue, a second grate below the first mentioned grate, means to conduct air from one of said headers to below said second grate, said bridge walls providing upward flow of gas through the first mentioned grate and upward flow of gas laterally of said first mentioned grate and downward flow of all of the gases to the flue, and means for introducing a combustible fluid in the downflow part of the incinerator.

5. An incinerator comprising walls forming a setting, air headers in opposite walls of said setting, a plurality of relatively closely spaced tubes connected to said headers and disposed to form a grate, a bridge wall at the rear of said grate having an aperture therein, a second bridge wall behind the first mentioned bridge wall, an exit flue, said second bridge wall extending above said flue, a second grate below the first mentioned grate, means to conduct air from one of said headers to below said second grate, said bridge walls providing upward flow of gas through the first mentioned grate and upward flow of gas laterally of said first mentioned grate and downward flow of all of the gases to the flue, and means for introducing fluid fuel for combustion between said grates.

6. An incinerator comprising walls forming a chamber, air headers at opposite sides of said chamber, a plurality of relatively closely spaced tubes connected to said headers and disposed in a generally horizontal direction to form an upper grate, a second grate below the upper grate, means to supply air to one of said headers, means to conduct air from the opposite header to the space below the second grate, and means for passing part of the gaseous fluid rising from the lower grate upwardly through the upper grate and for by-passing the rest thereof upwardly around one edge of the upper grate and mixing it with the gaseous fluid from the top of the upper grate.

7. An incinerator comprising walls forming a chamber, a plurality of relatively closely spaced tubes extending across said chamber to form an upper grate, a second grate below the upper grate, an outlet flue, an air supply header connected with all of said tubes at one side of the chamber, a second header at the opposite side of the chamber connected with the other ends of said tubes and extending with substantially uniform cross section outwardly, downwardly and inwardly to the space beneath the lower grate, said cross section being substantially the same in width as the length of the set of tubes and of height greater than the diameter of a tube whereby the velocity of air through the second header is relatively slow as compared with the velocity of flow through the tubes, and means for directing part of the gaseous fluid rising from the lower grate upwardly through the upper grate and part around the edge of the upper grate and then combining the parts and directing them to the outlet flue.

WILLIAM LINTON McEVER.